(12) United States Patent
Nichols, Jr.

(10) Patent No.: US 12,000,160 B1
(45) Date of Patent: *Jun. 4, 2024

(54) MULTI-FUNCTIONAL TAPPING BLOCK ASSEMBLY

(71) Applicant: Kraig D. Nichols, Jr., Port Saint Lucie, FL (US)

(72) Inventor: Kraig D. Nichols, Jr., Port Saint Lucie, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,558

(22) Filed: Jul. 1, 2023

Related U.S. Application Data

(63) Continuation-in-part of application No. 18/142,993, filed on May 3, 2023.

(60) Provisional application No. 63/359,916, filed on Jul. 11, 2022.

(51) Int. Cl.
| | |
|---|---|
| *E04F 21/22* | (2006.01) |
| *B25F 1/00* | (2006.01) |
| *G01B 3/04* | (2006.01) |

(52) U.S. Cl.
CPC .............. *E04F 21/22* (2013.01); *B25F 1/00* (2013.01); *G01B 3/04* (2013.01)

(58) Field of Classification Search
CPC ............... E04F 21/22; G01B 3/04; B25F 1/00
USPC ......................................................... 7/164
See application file for complete search history.

(56) References Cited

U.S. PATENT DOCUMENTS

| | | | | |
|---|---|---|---|---|
| 822,126 | A | * 5/1906 | Hopkins | ................. E04F 21/22 269/203 |
| 1,392,740 | A | 10/1921 | Berggren | |
| 2,636,716 | A | * 4/1953 | Fudge | ..................... E04F 21/22 254/13 |
| 3,015,889 | A | * 1/1962 | Godman | .................. B25H 7/04 33/666 |
| 3,584,862 | A | * 6/1971 | Wilson | ...................... B25B 1/02 269/189 |
| 5,768,793 | A | * 6/1998 | Fields | ...................... G01B 5/02 52/749.11 |
| 5,984,271 | A | 11/1999 | Ellenberger | |
| 7,171,790 | B2 | 2/2007 | Mei | |
| 7,712,199 | B1 | 5/2010 | Wilson | |
| 11,414,879 | B2 | 8/2022 | Weaver, IV | |
| 2002/0178870 | A1 | 12/2002 | Lowther | |
| 2010/0313714 | A1 | 12/2010 | Smith | |
| 2012/0297702 | A1 | 11/2012 | Hughey et al. | |
| 2020/0102759 | A1 | 4/2020 | Apt | |
| 2020/0256069 | A1 | 8/2020 | Suwyn et al. | |

* cited by examiner

*Primary Examiner* — Hadi Shakeri
(74) *Attorney, Agent, or Firm* — Glenn Gold, P.A.; Glenn E. Gold

(57) ABSTRACT

A multi-functional tapping block assembly for installing flooring planks having the combined functionalities of a conventional tapping block, a clamp, a measuring tape, an expansion gap spacer, a speed square, an alignment aid, and a line marking utensil.

19 Claims, 10 Drawing Sheets

MULTI-FUNCTIONAL TAPPING BLOCK ASSEMBLY

CROSS-REFERENCE TO RELATED APPLICATIONS

This application is a continuation-in-part of co-pending nonprovisional patent application Ser. No. 18/142,993, filed on May 3, 2023, which claims the benefit of U.S. provisional patent application No. 63/337,821 filed on May 3, 2022.

FIELD OF THE INVENTION

The present invention relates generally to flooring installation tools. More particularly, the invention pertains to a multi-functional tapping block assembly for installing flooring planks and the like.

BACKGROUND OF THE INVENTION

Traditionally, flooring installers rely on several specialized tools such as tapping blocks, speed squares, flooring cutters, clamps, wall spacers, measuring tapes, and markers. However, the accumulation of these tools can be cumbersome and time-consuming, leading to a less efficient installation process.

There is a well-established need in the flooring installation industry for a multi-functional tool to address these challenges by combining the functionalities of various individual tools into one versatile portable multi-functional tool. In particular, it would be highly desirable to provide such a tool which integrates the functionality of various individual flooring installation tools with the functionality of a conventional tapping block.

For example, it would be beneficial to incorporate the functionality of a measuring tape into a conventional tapping block body to enable use of the multi-functional tool to make linear measurements upon/along a flooring plank, thereby obviating the need to carry a separate measuring tape or similar measurement aid. Similarly, it would be beneficial to incorporate the functionality of a speed square into a conventional tapping block body to enable use of the multi-functional tool to make angular measurements upon a flooring plank, thereby obviating the need to carry a separate speed square.

Furthermore, it would be highly desirable to integrate the functionality of a conventional flooring installation clamp into a tapping block body such that the multi-functional tool would replace the need to carry individual flooring clamps. Moreover, it would be beneficial to do so in a manner enabling a flooring installer to clamp the multi-functional tool to a flooring plank adjacent to a plank edge, and subsequently manually manipulate the multi-functional tool to detach, or remove, an excess portion of the flooring plank along a scoring line in a plank surface.

Still further, it would be of great benefit to integrate the functionality of a conventional wall spacer into the tapping block body of the multi-functional device to enable a flooring installer to use the tapping block body to maintain an expansion gap between a wall and a flooring plank being installed adjacent to the wall.

It would be further desirable to provide a means for accurately aligning the tapping block body of the multi-functional tool with an edge of a flooring plank in a manner enabling use of the tool to accurately measure linear distances perpendicularly from the flooring plank edge to a location on the flooring plank surface. Preferably, the alignment means would also function as a means for laterally translating the tapping block body parallel to the flooring plank edge.

It would be of further benefit to provide a marking utensil holder providing means for selectively securing a marking utensil to the tapping block body in such a manner that the marker could be employed to impart linear marking lines at precise desired locations upon a flooring plank surface. Preferably, the marking utensil holder would be capable of enabling a linear marking line to be imparted upon a flooring plank surface parallel to the length, or lateral direction, of the tapping block body. Furthermore, it would be of great benefit to be able to locate, and subsequently fix, the marking utensil holder at a user-defined position along the tapping block body length.

Additionally, it would be desirable to incorporate a flooring plank engagement feature into the tapping block body, which reduced the likelihood of imparting damage to an edge or tongue of a flooring plank (i.e., when compared to conventional tapping block designs) while utilizing the multi-functional tool to tightly secure adjacent flooring planks to one another during a flooring installation operation.

BRIEF SUMMARY OF THE INVENTION

The present invention provides a multi-functional tapping block assembly which combines the functionality of a conventional tapping block with the functionalities of other conventional flooring installation tools commonly maintained, or carried, apart from the tapping block during the installation of flooring.

In accordance with a first exemplary implementation, a multi-functional tapping block assembly is provided which combines the functionality of a conventional tapping block with the functions of a conventional linear measuring aid (e.g., a tape measure) and a mechanical clamp. Structurally, the assembly is comprised of a one-piece tapping block body and a threaded mechanical fastener.

Preferably, the tapping block body has a solid monolithic construction and a geometry defined by a generally rectangular, uniformly thick, base portion having a raised linear feature protruding upwardly from a top side of the base portion. The raised linear feature extends in a lateral direction (i.e., parallel with a length dimension of the base portion), adjacent to a rear end of the base portion, from a left/distal end to an opposite right/proximal end of the base portion. The raised linear feature has a top side (or upper surface) with length measurement markings disposed therealong to enable use of the tool to make linear measurements, linear markings, and score lines, for example, from an edge of a flooring plank.

In this first exemplary implementation, the top side of the raised linear feature is adjoined to the top side of the base portion along a laterally-extending vertical shoulder; that is, a shoulder perpendicular to the horizontal top sides of the raised linear feature and the base portion. The laterally-extending vertical shoulder functions as a flooring plank contact surface for engaging a tongue or edge of a flooring plank during a tapping block operation, enabling the formation of tight seams between adjacent flooring planks in the usual manner.

Significantly, a front end of the base portion may have a longitudinally oriented floor plank receiving slot provided therein proximate to the left/distal end of the base portion. The floor plank receiving slot defines a pair of spaced-apart proximal and distal prongs on laterally opposite sides of the floor plank receiving slot. At least one of the spaced-apart prongs—preferably the proximal prong—has a lateral threaded opening extending completely therethrough.

A threaded fastener is provided sized and configured for threading engagement with the lateral threaded opening of the prong such that, during use of the multi-functional tapping block assembly as a clamp, an edge portion of a flooring plank may be clamped between a distal end of the threaded fastener and an interior surface of the floor plank receiving slot. In this manner, for example, the multi-functional tapping block assembly may be employed to detach an excess portion of the flooring plank by subsequently rotating the tapping block body along a plane perpendicular to a score line in an upper surface of the flooring plank.

The base portion of the tapping block body may have a lateral recess defined along its front end and running from the proximal prong toward, but short of, the right/proximal end of the tapping block body. A distal portion of the lateral recess may define a threaded fastener clearance, and a proximal portion of the lateral recess may define a hand/finger grip.

In accordance with a second exemplary implementation, the laterally-extending raised linear feature of the tapping block body may have a slightly altered geometry which, as addressed in more detail below, enables/facilitates mounting of a marker utensil-carrying slide assembly thereon. Accordingly, in this second exemplary implementation, the raised linear feature functions as a linear slide rail for carrying the marking utensil-carrying slide assembly.

In particular, a front side of the linear slide rail may have an inward taper from a top side of the linear slide rail to the top side of base portion of the tapping block body, and an opposite rear side of the linear slide rail may have a corresponding inward taper from the top side of the slide rail to the top side of the base portion. In this manner, the front side of the linear slide rail defines a tapered front shoulder functioning as a flooring plank contact surface for engaging a tongue or edge of flooring plank during installation of the plank. In accordance with an aspect of the invention, the tapered front shoulder acts to reduce the likelihood of damage to a flooring plank edge/tongue (i.e., in comparison to a vertical shoulder) when the present invention is employed as a tapping block. The inward taper of the front shoulder further functions to maintain sliding engagement between the slide rail and the aforementioned slide assembly.

The inwardly-tapered rear side of the linear slide rail is adjoined to a rear side of the base portion of the tapping block body along a horizontal rear shoulder. The horizontal rear shoulder provides a support surface for the aforementioned slide assembly. Preferably, the linear slide rail has length measurement markings disposed along its top side (or upper surface) enabling use of the tapping block body to make linear measurements.

In accordance with the second exemplary implementation, a right/proximal end of the tapping block body may extend downwardly for a distance ($D_1$) beyond the bottom surface of its base portion to define a linear lip having a uniform lip thickness.

In accordance with one aspect, the lip may function as wall spacer for maintaining a uniform expansion gap between a structural wall and an adjacent edge of a flooring plank during a flooring installation operation.

In accordance with another aspect, the lip may function as an alignment feature for aligning the right/proximal end of the tapping block body with an edge of a flooring plank to enable accurate alignment/orientation of the tapping block body with respect to the flooring plank edge (e.g., to measure distances from the plank edge). The lip also enables the tapping block body to be translated laterally parallel to the engaged edge of the flooring plank, which enables a flooring installer to create linear markings on the plank surface parallel to the plank edge. For example, a user may easily impart a marking line upon the upper surface of a flooring plank parallel to an edge of the flooring plank at a desired distance from the flooring plank edge. That is, with the edge alignment feature of the tapping block body abutting the flooring plank edge (and a marker coupled to the tapping block body a desired distance from the flooring plank edge), a user could simply slide the tapping block body laterally to impart the desired marking line.

Moreover, the lip enables the tapping block to be rotated about a contact point between the lip and the plank edge which, in conjunction with angular markings on the tapping block body (as described below), enables the tapping block body to function as a speed square.

As referenced above, angular measurement markings (e.g., hash marks) may be disposed upon at least one of the front and rear ends of the tapping block body. In particular, the angular measurement markings may be strategically located with respect to the linear alignment lip to enable use of the multi-functional tapping block assembly as a speed square to accurately measure angles with respect to a flooring plank edge (i.e., when the linear lip is functioning as an alignment feature). Linear marking/scoring lines may be subsequently imparted upon an upper surface of the flooring plank.

In accordance with the second exemplary embodiment, the multi-functional tapping block assembly may include a marking utensil-carrying slide assembly slidably mounted upon the linear slide rail feature. The slide assembly carries a marking utensil in a vertical orientation such that a marking line can be selectively imparted upon a flooring plank surface by translating the slide assembly along the linear slide rail feature.

The slide assembly may include a slide body for slidingly mounting the slide assembly to the linear slide rail feature, a slide lock carried by the slide body for positionally fixing the location of the slide body (and the corresponding marking utensil) along the linear slide rail feature, and a marker tool retention plunger subassembly for securing a marking utensil to the slide assembly.

In accordance with an aspect of the invention, with the marking utensil positionally fixed, or locked, along the linear slide rail the floor installation tapping block assembly may be linearly translated parallel to a flooring plank edge in order to impart a line parallel to the engaged edge of the flooring plank and at a set distance therefrom, wherein the line is oriented perpendicular to the orientation of the linear slide rail feature.

BRIEF DESCRIPTION OF THE SEVERAL VIEWS OF THE DRAWING

The preferred embodiments of the invention will hereinafter be described in conjunction with the appended drawings provided to illustrate and not to limit the invention, in which:

FIG. 5A is a front-top-left isometric view of a single flooring plank 150 having a score line 152a through its upper surface 152 defining the excess portion 150a to be removed.

Like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the terms "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 44:
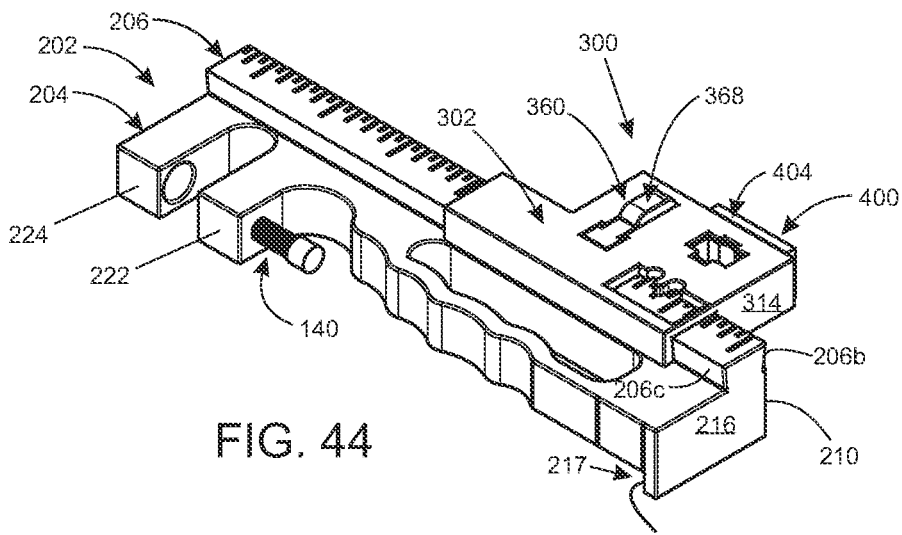
FIG. 44 is a front-top-right isometric view of fully-assembled slide assembly 300 slidably mounted upon linear slide rail feature 206 of tapping block body 202.
Figure 45:
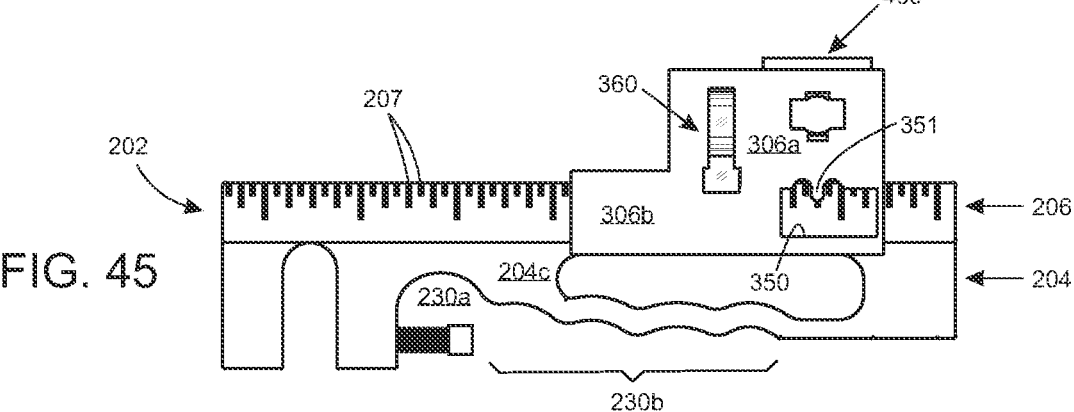
FIG. 45 is a top plan view of the fully-assembled slide assembly 300 mounted upon the linear slide rail feature 206 of tapping block body 202 introduced in FIG. 44.
Figure 46:
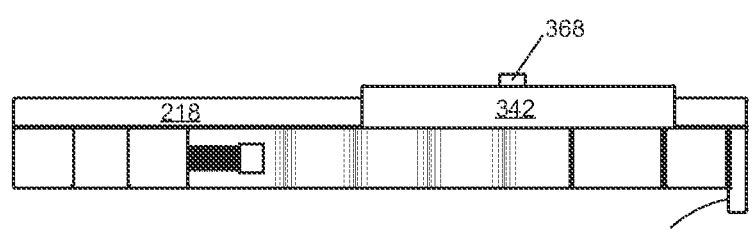
FIG. 46 is front elevation view of the fully-assembled slide assembly 300 mounted upon the linear slide rail feature 206 of tapping block 202 introduced in FIG. 44.
Figures 47, 48:
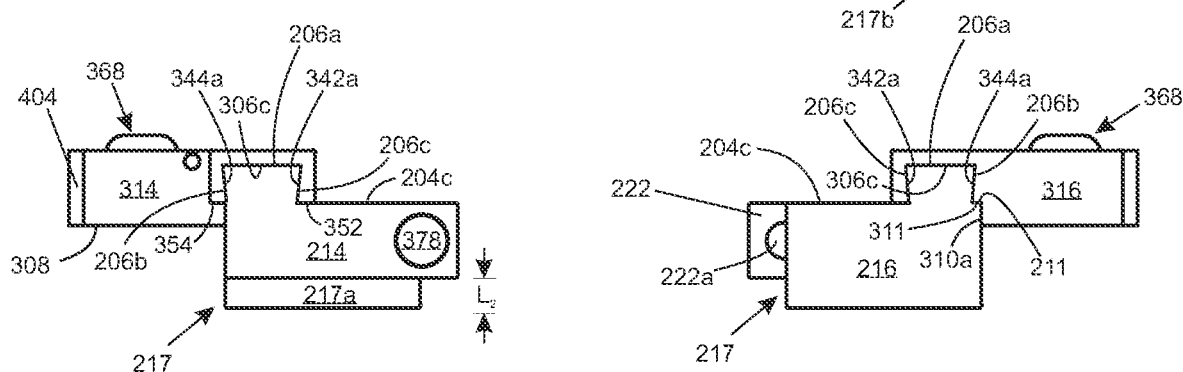
FIG. 47 is a left/distal end view of the fully-assembled slide assembly 300 mounted upon the linear slide rail feature 206 of tapping block 202 introduced in FIG. 44.
FIG. 48 is a right/proximal end view of the fully-assembled slide assembly 300 mounted upon the linear slide rail feature 206 of tapping block 202 introduced in FIG. 44.

For purposes of description herein, the terms "upper," "lower," "top," bottom," "front", "rear," "left," "right," "vertical," "horizontal" and derivatives thereof shall relate to the invention as oriented in FIG. 44. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-5a, a multi-functional tapping block assembly 100 is shown in accordance with a first exemplary implementation of the present invention. Multi-functional tapping block assembly 100 is comprised of a tapping block body 102 and a threaded fastener 140.

Preferably, tapping block body 102 has a solid metal monolithic construction, and may be manufactured using any available metal manufacturing methods (e.g., machining, casting, etc.). However, as those skilled in the art will recognize, tapping block body 102 may be constructed using alternative materials (e.g., polymers, composites, etc.) as long as the material choice does not interfere with the intended functions of the invention. Tapping block body 102 has a generally rectangular shape defined by a length (Li) and a width (Wi).

Laterally-extending tapping block body 102 has a base portion 104 having a planar top side 104a, an opposite planar bottom side 108, a rear end 110, an opposite front end 112, a left/distal end 114, and an opposite right/proximal end 116. A raised linear feature 106 extends upwardly from the top side 104a of the base portion 104 adjacent to the rear end 110. The raised linear feature 106 extends laterally from the left/distal end 114 to the right/proximal end 116 of the tapping block body 102. The raised linear feature 106 has a top side 106a adjoined to the top side 104a of the base portion 104 via a vertical shoulder 118. The top side 106a of the raised linear feature has length measurement markings 107 (e.g., hash marks) disposed along its length. The length measurement markings 107 enable use of tapping block assembly 100 for making on-the-fly measurements. Base portion 104 preferably has a uniform thickness ($T_1$), except along the raised linear feature 106 where it has an increased uniform thickness ($T_2$).

Front end 112 of the base portion 104 of tapping block body 102 has a longitudinally-oriented flooring plank-receiving slot 120 provided therein proximate to the left/distal end 114 of the base portion 104. That is, the flooring plank-receiving slot 120 is oriented perpendicular to the length dimension (Li) of the tapping block body 102. Flooring plank-receiving slot 120 defines a pair of spaced-apart proximal and distal prongs, 122 and 124, respectively, on laterally opposite sides thereof. Proximal prong 122 has a lateral threaded opening 122a extending completely therethrough. Threaded fastener 140 is sized and configured for threading engagement with the lateral threaded opening 122a in proximal prong 122. Together, the flooring plank-receiving slot 120 and the threaded fastener 140 provide the functionality of a conventional mechanical clamp. Optionally, distal prong 124 may be provided having a lateral opening 124a extending completely therethrough and aligned with the threaded opening 122a in proximal prong 122 along a common central axis (X).

As is well known to those in the flooring installation industry, it is often necessary to modify the length or width of a flooring plank during the installation process. Various plank cutting devices are known; however, they are often cumbersome to use and do not lend themselves to being carried about during a flooring installation. Consequently, many flooring installers use a conventional utility knife (along with a straightedge) to make a cut, or a score line, into a plank upper surface 152. Unfortunately, the process of subsequently bending the flooring plank along the score line often results in injuries to the hands and fingers of the installer.

Figure 1:
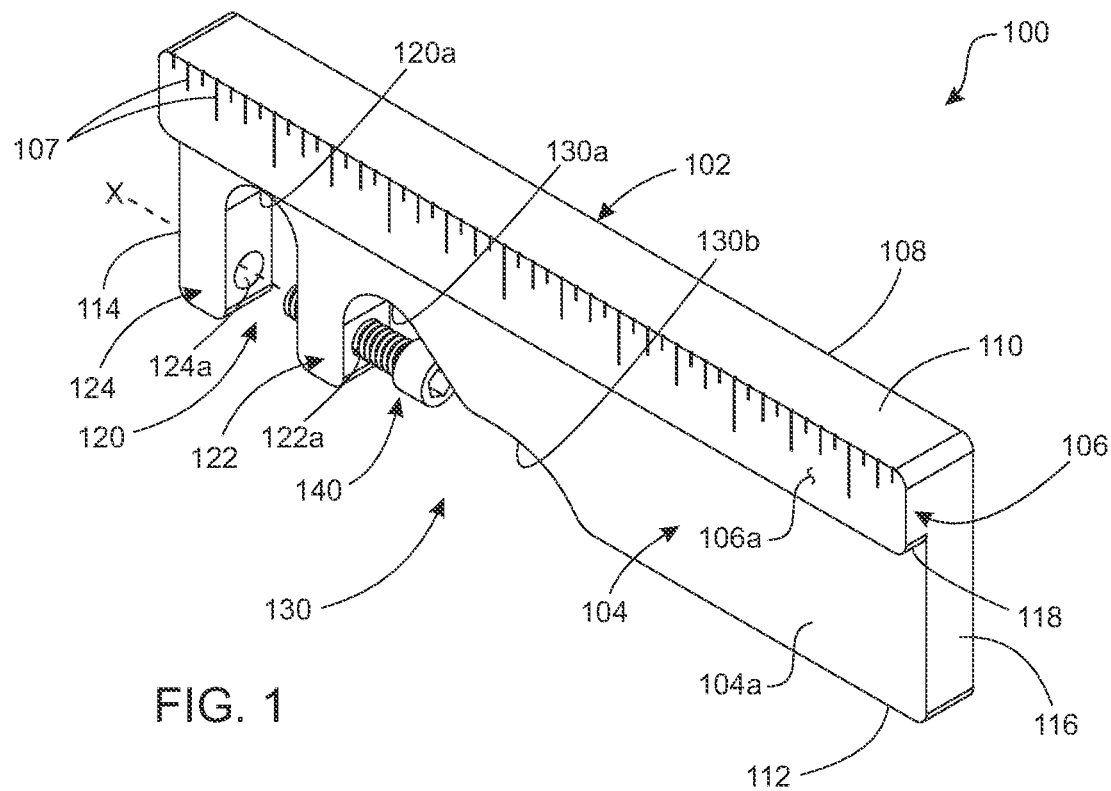
FIG. 1 is a front-right-rear isometric view of a flooring installation tapping block assembly 100 in accordance with a first exemplary implementation of the invention.
Figure 2:
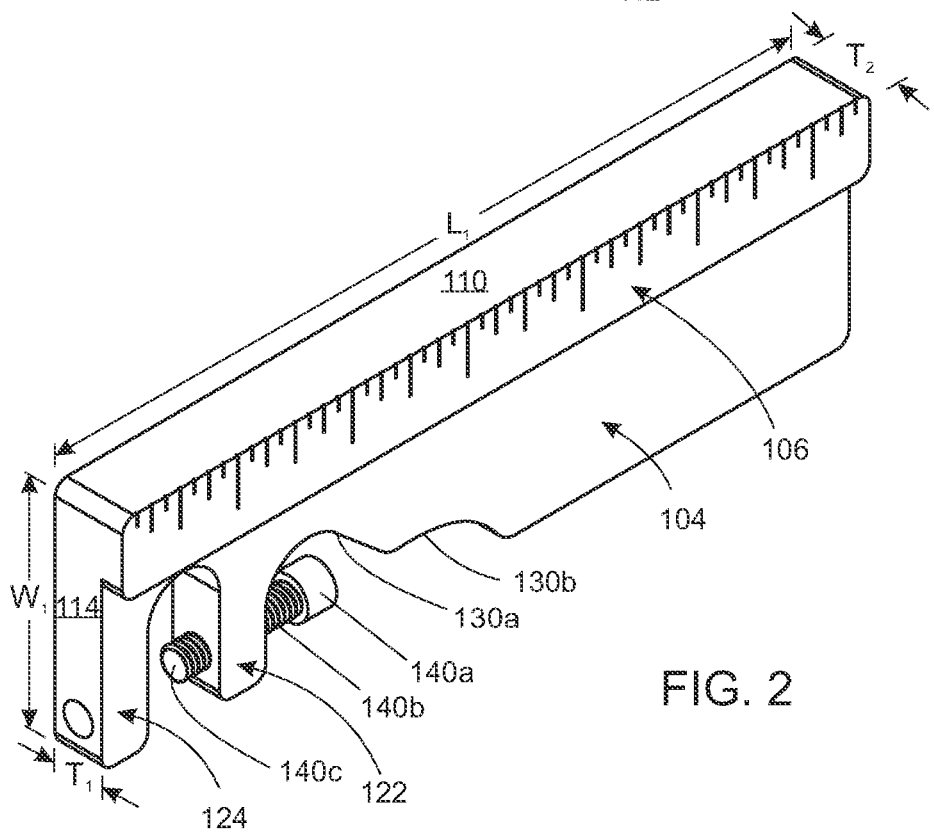
FIG. 2 is a front-left-rear isometric view of the flooring installation tapping block assembly 100 originally introduced in FIG. 1.
Figure 3:
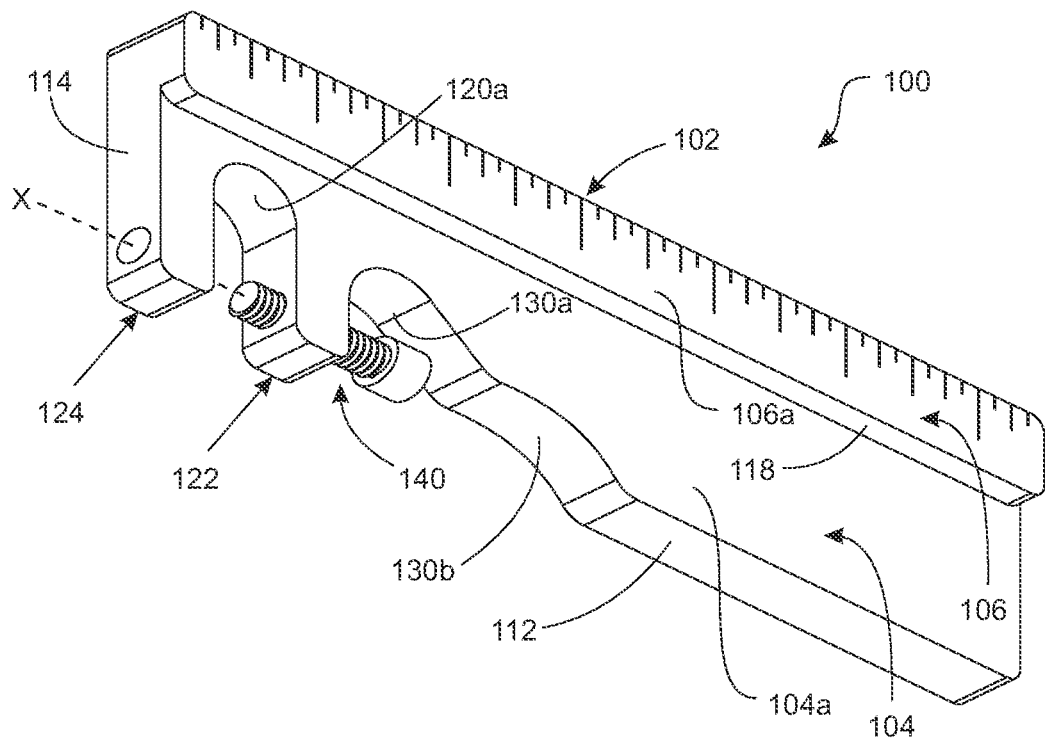
FIG. 3 is a bottom-left-front isometric view of the flooring installation tapping block assembly 100 originally introduced in FIG. 1.
Figure 4:
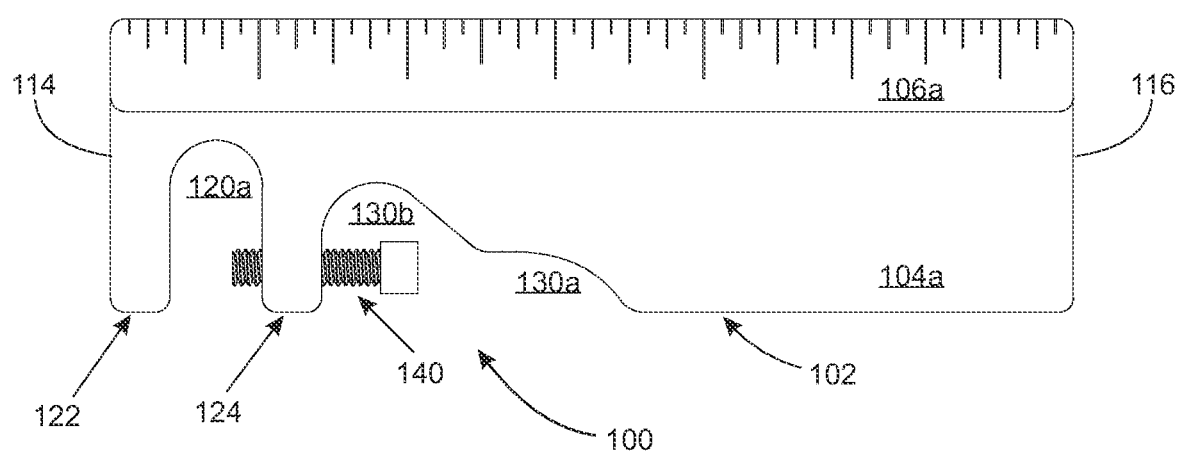
FIG. 4 is a front elevation view of the flooring installation tapping block assembly 100 originally introduced in FIG. 1.
Figure 5:
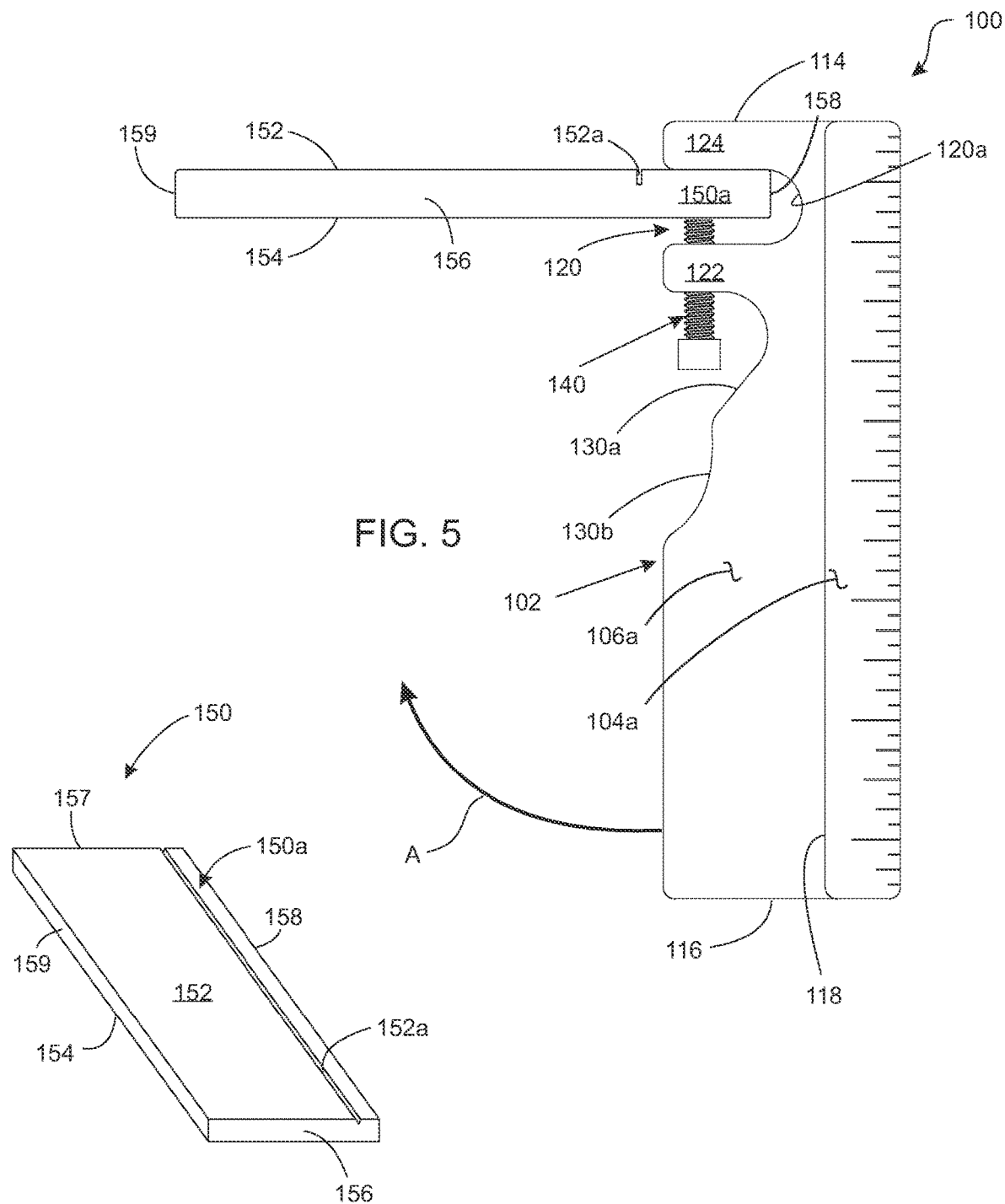
FIG. 5 is a front elevation view illustrating a use of the flooring installation tapping block assembly 100 originally introduced in FIG. 1 to detach, or remove, an excess portion 150a of a flooring plank 150 prior to its installation.
Figure 6:
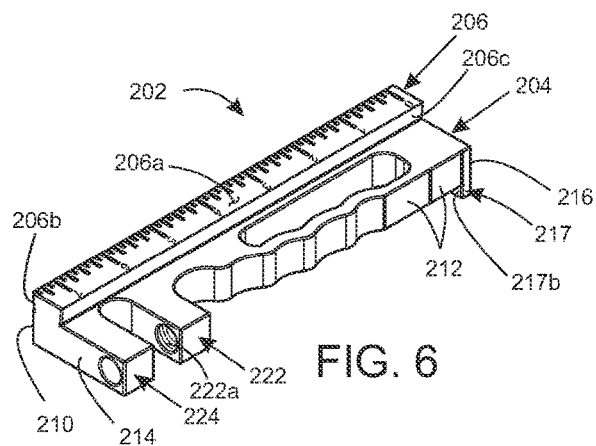
FIG. 6 is a front-top-left isometric view of a flooring installation tapping block body 202 in accordance with a second exemplary implementation of the present invention.
Figure 7:
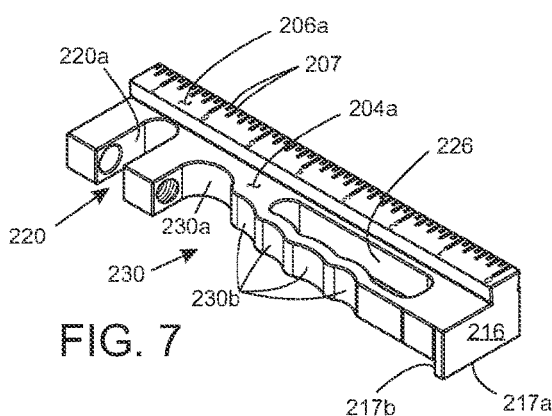
FIG. 7 is a front-top-right isometric view of the flooring installation tapping block body 202 originally introduced in FIG. 6.
Figure 8:
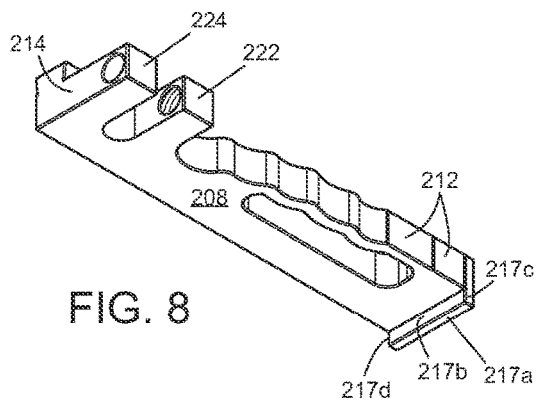
FIG. 8 is front-bottom-left isometric view of the flooring installation tapping block body 202 of FIG. 6.
Figure 9:
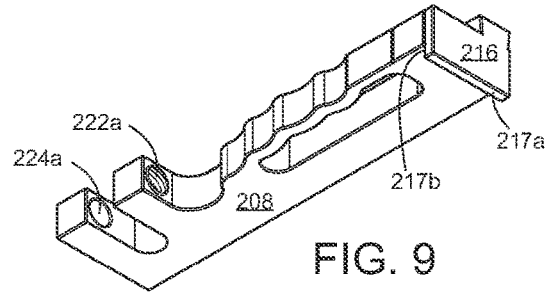
FIG. 9 is a front-bottom-right isometric view of the flooring installation tapping block body 202 of FIG. 6.
Figure 10:
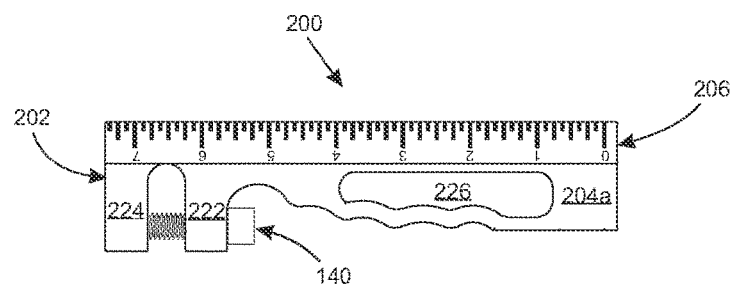
FIG. 10 is a top elevation view of the flooring installation tapping block body 202 originally introduced in FIG. 6 with a mechanical fastener 140 assembled thereto.
Figure 11:
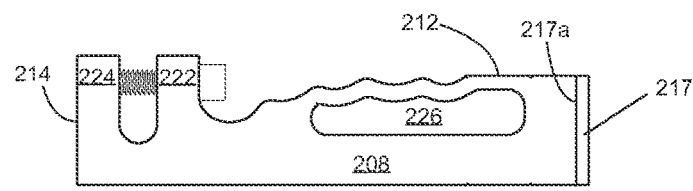
FIG. 11 is a bottom elevation view of the flooring installation tapping block body 202 shown in FIG. 10 with the tapping block body shown inverted.
Figure 12:
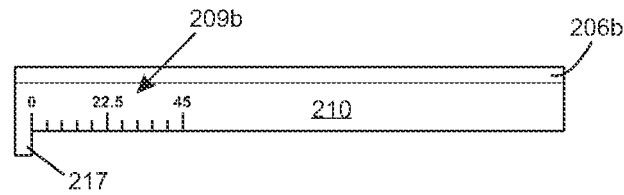
FIG. 12 is a rear elevation view of the flooring installation tapping block body 202 shown in FIG. 10.
Figure 13:
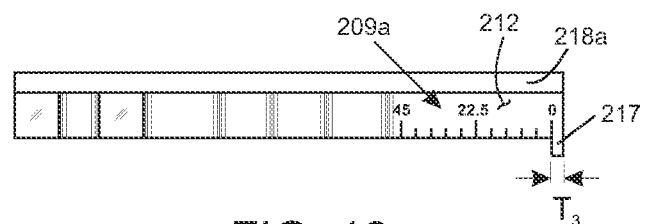
FIG. 13 is a front elevation view of the flooring installation tapping block body 202 shown in FIG. 10.
Figure 14:
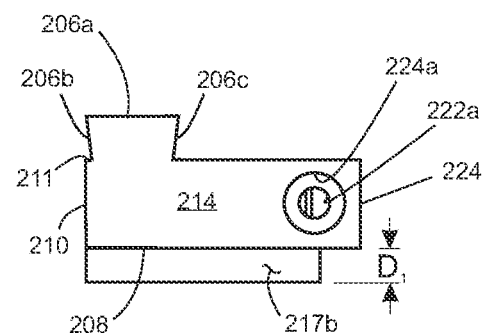
FIG. 14 is a left/distal end view of the flooring installation tapping block body 202 shown in FIG. 10.
Figure 15:
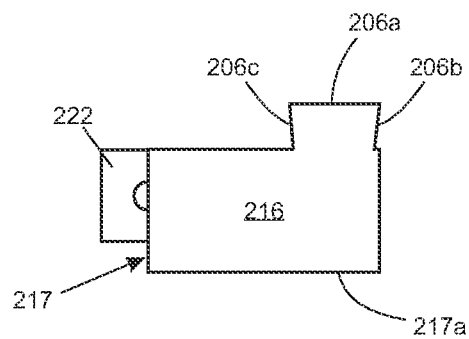
FIG. 15 is a right/proximal end view of the flooring installation tapping block body 202 shown in FIG. 10.
Figure 16:
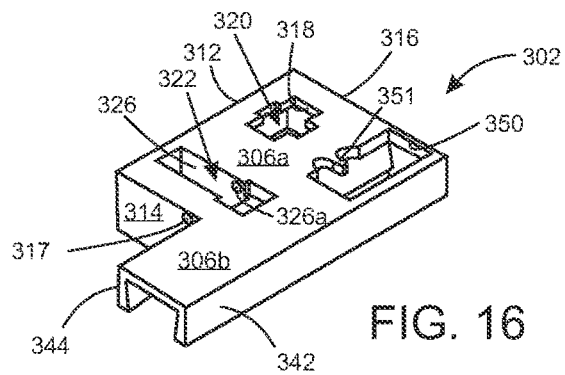
FIG. 16 is a front-top-left isometric view of a slide body 302 in accordance with the second exemplary implementation of the present invention.
Figure 17:
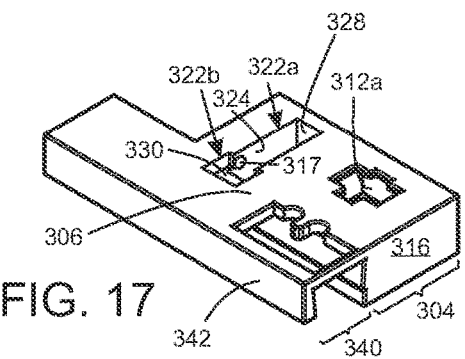
FIG. 17 is front-top-right isometric view of the slide body 302 originally introduced in FIG. 16.
Figure 18:
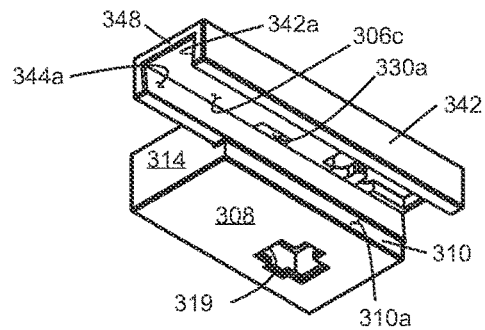
FIG. 18 is a front-bottom-left isometric view of the slide body 302 originally introduced in FIG. 16.
Figure 19:
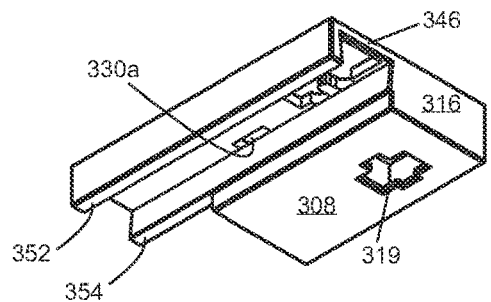
FIG. 19 is a front-bottom-right isometric view of the slide body 302 originally introduced in FIG. 16.
Figure 20:
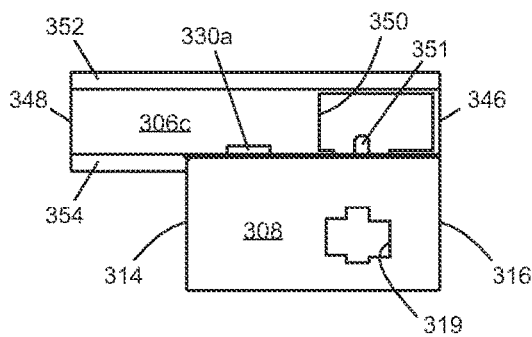
FIG. 20 is a bottom plan view of the slide body 302 originally introduced in FIG. 16.
Figure 21:
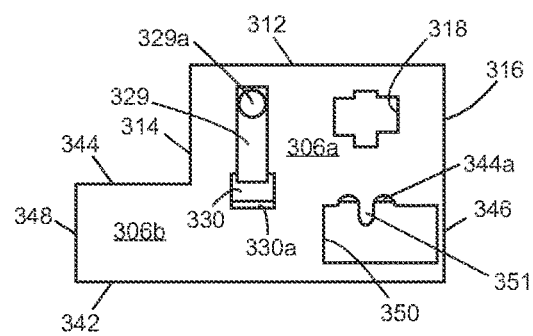
FIG. 21 is a top plan view of the slide body 302 originally introduced in FIG. 16.
Figure 22:
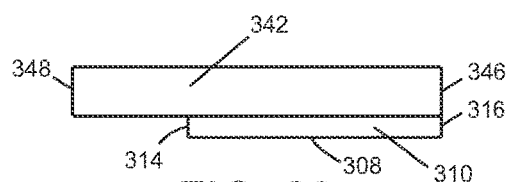
FIG. 22 is front elevation view of the slide body 302 originally introduced in FIG. 16.
Figure 24:
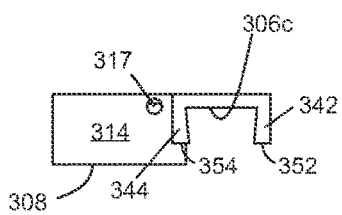
FIG. 24 is a left/distal end view of the slide body 302 originally introduced in FIG. 16.
Figure 23:
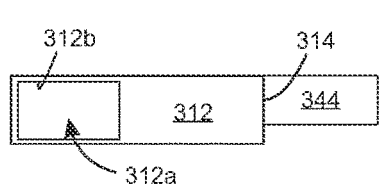
FIG. 23 is a rear elevation view of the slide body 302 originally introduced in FIG. 16.
Figure 25:
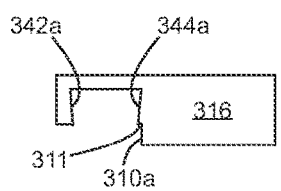
FIG. 25 is a right/proximal end view of the slide body 302 originally introduced in FIG. 16.
Figure 26:
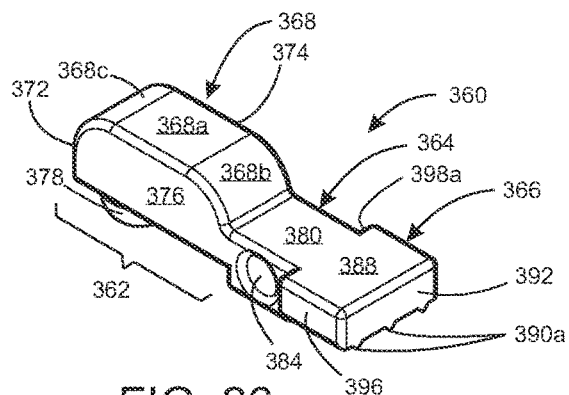
FIG. 26 is a front-top-left isometric view of a slide lock member 360 in accordance with the second exemplary implementation of the invention.
Figure 27:
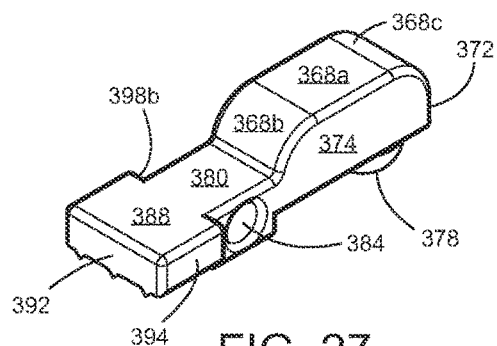
FIG. 27 is a front-top-right isometric view of the slide lock member 360 originally introduced in FIG. 26.
Figure 28:
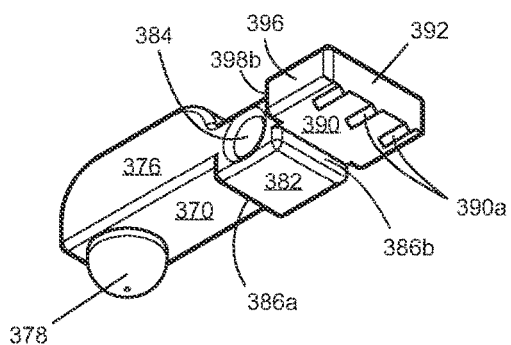
FIG. 28 is a front-bottom-left isometric view of the slide lock member 360 originally introduced in FIG. 26.
Figure 29:
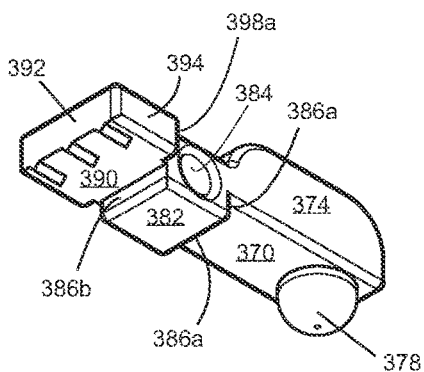
FIG. 29 is a front-bottom-right isometric view of the slide lock member 360 originally introduced in FIG. 26.
Figure 30:
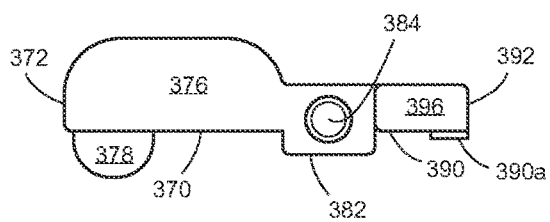
FIG. 30 is a left elevation view of the slide lock member 360 originally introduced in FIG. 26.
Figure 31:
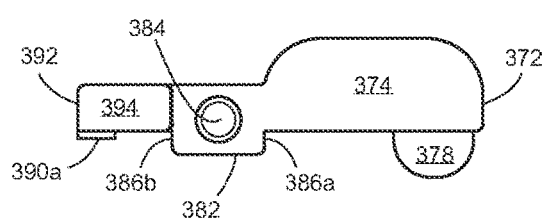
FIG. 31 is a right elevation view of the slide lock member 360 originally introduced in FIG. 26.
Figure 32:
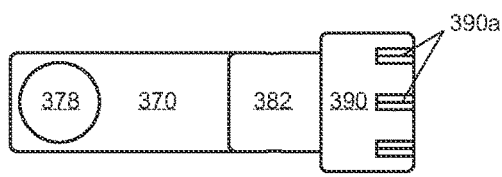
FIG. 32 is bottom plan view of the slide lock member 360 originally introduced in FIG. 26.
Figure 33:
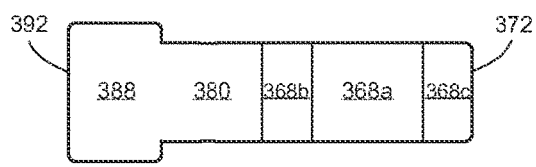
FIG. 33 is a top plan view of the slide lock member 360 originally introduced in FIG. 26.
Figure 34:
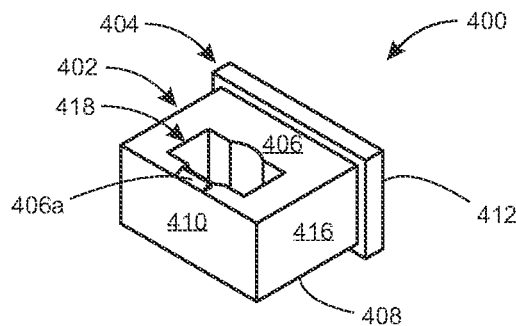
FIG. 34 is a front-top-right isometric view of a main body 402 of a marker tool retention plunger assembly 400 in accordance with the second exemplary implementation of the present invention.
Figure 35:
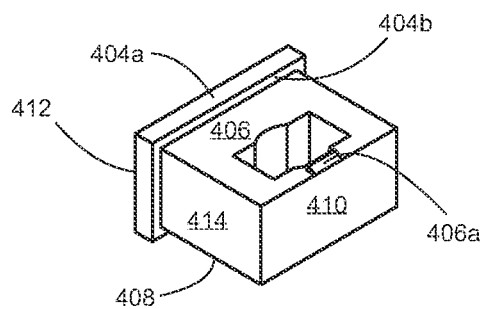
FIG. 35 is a front-top-left isometric view of the main body 402 originally introduced in FIG. 34.
Figure 36:
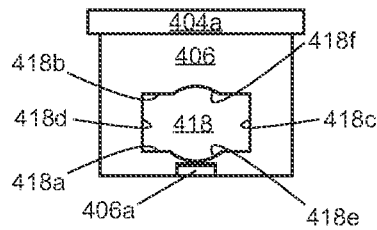
FIG. 36 is top plan view of the main body 402 originally introduced in FIG. 34.
Figure 37:
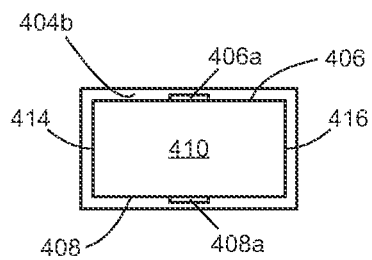
FIG. 37 is a front elevation view of the main body 402 originally introduced in FIG. 34.
Figure 38:
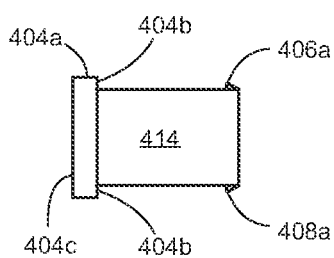
FIG. 38 is a left side elevation view of the main body 402 originally introduced in FIG. 34.
Figure 39:
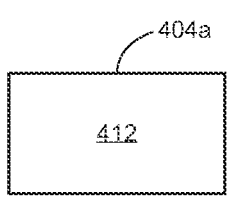
FIG. 39 is a rear elevation view the main body 402 originally introduced in FIG. 34.
Figure 40:
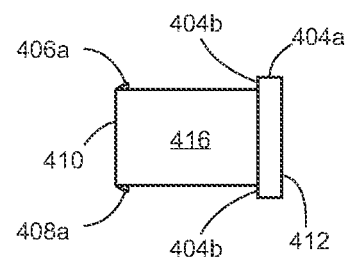
FIG. 40 is a right side elevation view of the main body 402 originally introduced in FIG. 34.

Referring now particularly to FIGS. 5 and 5a, in accordance with a significant aspect of the invention, the clamping functionality may be employed to detach an excess portion 150a of a flooring plank 150. As shown in FIG. 5a, an exemplary flooring plank 150 may be defined by an upper surface 152, an opposite lower surface 154, a right end 156, an opposite left end 157, a rear end 158, and an opposite front end 159. A score line 152a in the upper surface 152 of the flooring plank 150 separates the excess portion 150a from the remainder of the flooring plank. Use of the tapping block assembly 100 as a clamping mechanism to excise the excess portion 150a of the flooring plank 150 will now be described. Initially, the excess portion 150a adjacent to the rear end 158 of the flooring plank 150 may be partially inserted into the flooring plank-receiving slot 120 in the base portion 104 of the tapping block body 102, and subsequently clamped between a distal end 140c of the threaded fastener 140 and an interior surface 120a of flooring plank-receiving slot 120. Subsequently, the excess portion 150a of the flooring plank 150 may be detached by manually rotating the tapping block body 102 (as indicated by directional arrow A) along a plane perpendicular to score line 152a until the excess portion is detached from the remainder of the flooring plank. Optionally, the installer/user may support the flooring plank 150 on a surface (not shown) to facilitate this process.

The base portion 104 of the tapping block body 102 may be provided having a lateral recess 130 defined along the front end 112 of its base portion 104. Lateral recess 130 preferably extends from proximal prong 122 toward, but short of, the right/proximal end 116 of the tapping block body 102. A distal portion of the lateral recess 130 may define a threaded fastener clearance 130a for the head 140a and shank 140b of threaded fastener 140, to facilitate the threading insertion of the threaded fastener through threaded opening 122a of proximal prong 122. The head 140a of threaded fastener 140 remains disposed within the threaded fastener clearance portion 130a of lateral recess 130 such that a user can selectively manipulate the threaded fastener when the tapping block assembly 100 is being used to excise a portion of a flooring plank 150 during a flooring installation process, yet the entire threaded fastener is coupled to the tapping block body 102 in such a manner that it does not interfere when the tapping block assembly is being used to install the flooring plank. That is, while the tapping block assembly 100 is functioning to protect a flooring plank from a hammer during installation, threaded fastener 140 does not interfere with the installation process. A corresponding proximal portion of the lateral recess 130 may define a hand/finger gripping portion 130b.

Referring now generally to FIGS. 6-48, a tapping block assembly 200 is shown in accordance with a second exemplary implementation of the invention. In this alternate implementation, a tapping block body 202 is provided having a modified geometry vis-à-vis tapping block body 102. The modified geometry enables the tapping block assembly 200 to incorporate additional functionality.

Referring initially to FIGS. 6-15, tapping block body 202 (like tapping block body 102) preferably has a solid metal monolithic construction, and may be manufactured using any available metal manufacturing methods (e.g., machining, casting, etc.). However, as those skilled in the art will recognize, tapping block body 202 may be constructed using alternative materials (e.g., polymers, composites, etc.) as long as the material choice does not interfere with the intended functions of the invention. Tapping block body 202 (like tapping block body 102) has a generally rectangular shape.

Laterally-extending tapping block body 202 includes a base portion 204 having a top side 204a, an opposite bottom side 208, a rearward, or rear, end 210, an opposite forward, or front, end 212, a left/distal end 214, and an opposite right/proximal end 216. Optionally, an elongated lateral interior opening 226 may be provided extending completely base portion 204. A raised linear slide rail feature 206 extends upwardly from the top side 204a of the base portion 204 adjacent to the rear end 210. The raised linear slide rail feature 206 extends laterally from the left/distal end 214 to the right/proximal end 216 of the tapping block body 202.

The raised linear slide rail feature 206 has a geometry defined by a planar top side 206a, an inwardly tapered rear side 206b and an opposite inwardly tapered front side 206c. By way of example, the taper angle of inwardly-tapered rear and front sides, 206b and 206c, respectively, may be within a range of 5 to 10 degrees. However, the taper angle may fall outside of this preferred range without departing from the intended scope of the invention. Planar top side 206a has recessed measurement hash marks 207 along its length.

A laterally extending shoulder 211 adjoins the rearward end 210 of the tapping block body 202 and the inwardly tapered rear side 206b of the raised linear slide rail feature 206. As described in further detail herein, laterally extending shoulder 211 functions as a support surface for a slide body 302 (FIGS. 16-25) that may be optionally coupled to tapping block body 202. Inwardly-tapered front side 206c defines a shoulder adjoining top side 206a of raised linear slide rail feature 206 and top side 204a of base portion 204 of tapping block body 202. Significantly, the present applicant has found that the inward taper of front side 206c reduces the likelihood of damage to an edge or tongue of a flooring plank during use of the tapping block to tightly couple adjacent flooring planks to one another.

Similar to the tapping block body 102 of multi-functional tapping block assembly 100, front end 212 of base portion 204 of tapping block body 202 has a longitudinally-oriented flooring plank-receiving slot 220, defined by interior slot surface 220a, provided therein proximate to the left/distal end 214 of the base portion 204. That is, the flooring plank-receiving slot 220 is oriented perpendicular to the length dimension of the tapping block body 202. Flooring plank-receiving slot 220 defines a pair of spaced-apart proximal and distal prongs, 222 and 224, respectively, on laterally opposite sides thereof. Proximal prong 222 has a lateral threaded opening 222a extending completely therethrough. Threaded fastener 140 is sized and configured for threading engagement with the lateral threaded opening 222a in proximal prong 222. Together, the flooring plank-receiving slot 220 and the threaded fastener 140 provide the functionality of a conventional mechanical clamp, as previously described with respect to tapping block body 102. Optionally, distal prong 224 may be provided having a lateral opening 224a extending completely therethrough and aligned with the threaded opening 222a in proximal prong 222 along a common central axis. Flooring plank-receiving slot 220 may work in conjunction with threaded fastener 140 to provide clamping functionality, in the same manner as previously described with respect to tapping block assembly 100.

The base portion 204 of the tapping block body 202 may have a lateral recess 230 defined along the front end 212 of its base portion 204. Lateral recess 230 is similar to the lateral recess 130 in base portion 104 of tapping block body 102, except for a slight modification from the finger grip portion 130b. Accordingly, lateral recess 230 preferably extends from proximal prong 222 toward, but short of, the right/proximal end 216 of the tapping block body 202. A distal portion of the lateral recess 230 may define a threaded fastener clearance 230a for the head 140a and shank 140b of threaded fastener 140, to facilitate the threading insertion of the threaded fastener through threaded opening 222a of proximal prong 222. The head 140a of threaded fastener 140 remains disposed within the threaded fastener clearance portion 230a of lateral recess 230 such that a user can manually manipulate the threaded fastener. A corresponding proximal portion of the lateral recess 230 may define a hand gripping portion 230b. Unlike the finger gripping portion 130b of lateral recess 130, the hand gripping portion 230b of lateral recess 230 defines a plurality of individual adjacent finger engaging recesses for improved gripping.

Significantly, the right/proximal end 216 of tapping block body 202 may extend downwardly a distance ($D_1$) beyond the bottom side 208 to define a linear lip 217 at the right/proximal end 216 of the tapping block body 202. Linear lip 217 has a lower end 217a, an interior surface 217b, a front interior corner 217c and a rear interior corner 217d. Linear lip 217 has multiple uses, or functions.

In accordance with one such function, lip 217 may be used as flooring expansion spacer for maintaining a uniform expansion gap between a structural wall and an adjacent edge of a flooring plank during installation. Accordingly, linear lip 217 preferably has a uniform thickness ($T_3$) within a typical thickness range of conventional expansion spacer thicknesses used for this purpose. Preferably, linear lip 217 has a uniform thickness ($T_3$) within a range of about 3/16 inches (4.7625 mm) to about ¼ inches (6.35 mm).

In accordance with another function, linear lip 217 may be used as an alignment feature for aligning the right/proximal end 216 of tapping block body 202 with an edge of a flooring plank to enable accurate alignment/orientation of the tapping block body 202 with respect to the flooring plank edge, for example, to measure distances perpendicular to the flooring plank edge. Accordingly, the interior surface 217b of linear lip 217 (i.e., the surface that abuts, or contacts, the plank edge) is laterally aligned with the zero-inch (0") hash mark on the top side 206a of the linear slide rail feature 206.

In accordance with another function, linear lip 217 enables the multi-functional tapping block assembly 200 to be translated laterally parallel to the engaged edge of the flooring plank. As discussed further herein, when a slide assembly 300 (FIGS. 16-25) of the present invention is employed to positionally fix a marking utensil along linear slide rail feature 206 the multi-functional tapping block assembly 200 may be laterally translated to impart a marking line upon an upper surface of the flooring plank, parallel to the flooring plank edge, a user-defined distance from the flooring plank edge. For example, this function may be employed to define an excess flooring plank portion for subsequent detachment along a corresponding score line.

That is, with the interior surface 217b of linear lip 217 abutting the flooring plank edge, and a marking utensil coupled to the tapping block body (i.e., via the slide assembly 300) a desired distance from the flooring plank edge, a user can simply translate the tapping block body laterally along the edge to impart the desired marking line on the flooring plank upper surface.

In accordance with another function, linear lip 217 enables the multi-functional tapping block assembly 200 to be rotated about a contact location between either the front or rear interior corner, 271c or 217d, respectively, of the linear lip 217 and the flooring plank edge. As discussed further herein, when employed in conjunction with angular measurement markings, or hash marks, along either the rearward end 210 or the forward end 212 of tapping block body 202 this feature enables use of the multi-functional tapping block assembly 200 as a speed square to measure an angular rotation of the tapping block body 202 with respect to contact edge of the flooring plank.

As referenced above, angular measurement markings 209a, 209b (see FIGS. 12-13), may be disposed upon the forward end 212 of tapping block body 202, the rearward end 210 of tapping block body 202, or both. The angular measurement markings, or hash marks, are strategically located with respect to the interior surface 217b of linear alignment lip 217. More specifically, when the interior surface 217b of linear alignment lip 217 is flush with a flooring plank edge, the length dimension of the tapping block body 202 is oriented at a ninety-degree (90°) angle with respect to the flooring plank edge. Subsequently, the tapping block body 202 may be rotated counter-clockwise about front interior corner 217c of linear alignment lip 217 or clockwise about rear interior corner 217d of the linear alignment lip.

Where the tapping block body 202 is rotated counter-clockwise about the front interior corner 217c of the linear alignment lip 217, the intersection between the angular hash marks 209a on the forward end 212 of base portion 204 and the flooring plank edge define the precise degree of angular rotation of the tapping block body. Conversely, where tapping block body 202 is rotated clockwise about the rear interior corner 217d of linear alignment lip 217 the intersection between the angular markings 209b on the rearward end 210 of the base portion and the flooring plank edge define the angular rotation of the tapping block body. In this manner, the multi-functional tapping block assembly 200 may be rotated to a desired angle vis-à-vis the flooring plank edge and a marking/scoring line subsequently imparted upon the flooring plank surface.

Figure 41:
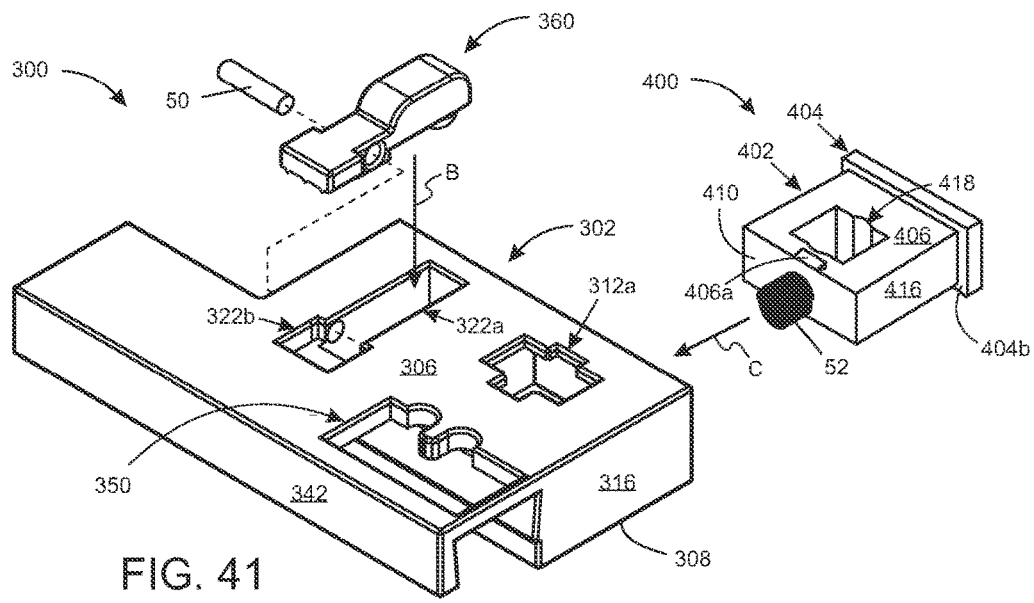
FIG. 41 is a front-top-right isometric exploded view of a slide assembly 300 that slidingly engages linear slide rail feature 206 of tapping block body 202 in accordance with the second exemplary implementation of the present invention.

Referring now to generally to FIGS. 16-48, a slide assembly 300 is shown in accordance with second exemplary implementation of the present invention. Referring briefly to FIG. 41, slide assembly 300 generally includes a slide body 302, a slide lock member 360 assembled to the slide lock body with a rigid pin 50, and a marking utensil retention plunger assembly 400 including a main body 402 and a compression spring 52.

Referring to particularly to FIGS. 16-25, slide body 302 preferably has a unitary molded construction defining a housing portion 304 and a slide rail engagement portion 340 contiguous with the housing portion. The housing portion 304 carries the marking utensil retention plunger assembly 400 and the slide lock member 360. The slide rail engagement portion 340 facilitates sliding engagement of the slide body 302 with linear slide rail feature 206 of tapping block body 202.

Housing portion 304 has a geometry defined by a top side 306, an opposite bottom side 308, a front side 310, an opposite rear side 312, a left/distal side 314 and an opposite right/proximal side 316. Top side 306 includes top side area 306a of housing portion 304 and top side area 306b of slide rail engagement portion 340 of slide body 302. Top side areas 306a and 306b are contiguous. Rear side 312 of housing portion 304 has an opening 312a sized and shaped for receiving main body 402 of marking utensil retention plunger 400 therethrough for containment within marking utensil retention plunger body-receiving cavity 320. An upper opening 318 is provided through top side area 306a of housing portion 304 in communication with cavity 320. A corresponding lower opening 319 is provided through bottom side 308 of housing portion 304 in communication with cavity 320. Preferably, upper and lower openings, 318 and 319, respectively, have identical footprints and are vertically aligned with one another.

A slide lock receiving cavity 322 extends into top side 306 of slide body 302 for receiving slide lock member 360 therein. Generally, slide lock receiving cavity 322 includes a rearward portion 322a and a forward portion 322b. Rearward portion 322a of slide lock receiving cavity 322 is further defined by a left side wall 324, an opposite right side wall 326, a rear side wall 328 and a bottom side wall 329. As further elaborated upon herein, bottom side wall 329 may have a circular depression 329a formed therein for containing a resilient biasing member 378 of slide lock member 360. Forward portion 322b of slide lock receiving cavity 322 is sized and shaped for receiving a forward portion 366 of slide lock member 360. Forward portion 322b is partially defined by a bottom side wall 330 having a slot 330a extending completely therethrough. A first pin-supporting aperture 317 is provided extending from left/distal side 316 of housing portion 304 to left side wall 324 of rearward portion 322a of slide lock receiving cavity 322 of slide body 302. A second pin-supporting aperture 326a is provided extending into right side wall 326 of rearward portion 322a of slide lock receiving cavity 322 of slide body 302. First and second pin-supporting apertures, 317 and 326a, respectively, are laterally aligned along a common axis.

Slide rail engagement portion 340 of slide body 302 is at least partially defined by a forward lateral side 342, an opposite rearward lateral side 344, a right/proximal end 346, and an opposite left/distal end 348. Forward lateral side 342 has an inwardly tapered interior surface 342a, and rearward lateral side 344 has an inwardly tapered interior surface 344a. Forward lateral side 342 of slide rail engagement portion 340 terminates at a lower edge 352, and rearward lateral side 344 of slide rail engagement portion 340 terminates at a lower edge 354. A laterally-extending shoulder 311 adjoins an exterior surface 310a of front side 310 of housing portion 304 and interior surface 344a of rear lateral side 344 of slide rail engagement portion 340 of slide body 302. A measurement viewing opening 350 is provided through top side area 306b of slide rail engagement portion 340 of slide body 302. A visual measurement indicator projection 351 is provided extending interiorly into measurement viewing opening 350.

Referring now particularly to FIGS. 26-33, slide lock member 360 preferably has a unitary molded construction (except for resilient biasing member 378). Generally, slide lock member 360 has a rearward portion 362, an intermediate portion 364, and a forward portion 366.

Rearward portion 362 of slide lock member 360 is at least partially defined by a top side 368, an opposite bottom side 370, and a rear end 372. Rearward portion 362 and intermediate portion 364 of slide lock member 360 share a common right side 374 and an opposite left side 376. Top side 368 may include contiguous intermediate area 368a, forward area 368b, and rearward area 368c. As described in greater detail herein, a resilient biasing member 378 is provided depending downwardly from bottom side 370 of rearward portion 362 of slide lock member 360.

Intermediate portion 364 of slide lock member 360 is at least partially defined by a top side 380 and an opposite bottom side 382. A lateral opening 384 is provided extending completely through intermediate portion 364 of slide lock member 360. A first shoulder 386a adjoins bottom side 382 of intermediate portion 364 and bottom side 370 of rearward portion 362 of slide lock member 360. A second shoulder 386b adjoins bottom side 382 of intermediate portion 364 and bottom side 370 of rearward portion 362 of slide lock member 360.

Forward portion 366 of slide lock member 360 is at least partially defined by a top side 388, an opposite bottom side 390, a front end 392, a right side 394, and an opposite left side 396. A third shoulder 398a adjoins right side 374 of rearward and intermediate portions, 362 and 364, respectively, with right side 394 of forward portion 366 of slide lock member 360. A fourth shoulder 398b adjoins left side 376 of rearward and intermediate portions, 362 and 364, respectively, with left side 396 of forward portion 366 of slide lock member 360. Locking projections 390a are provided extending downwardly from bottom side 390 of forward portion 366 of slide lock member 360. As described in greater detail herein, locking projections 390a are configured and oriented for selectively frictionally engaging the recessed measurement hash marks 207 on the top side 206a of linear slide rail feature 306.

Referring now particularly to FIGS. 34-40, a marking utensil retention plunger 400 may be provided for selectively securing a marking utensil to the housing portion 304 of slide body 302 such that the marking utensil extends vertically through housing portion upper and lower openings, 318 and 319, respectively, with a marking end of the marking utensil projecting downwardly a distance below bottom side 308 of housing portion 304 of slide body 302.

Marking utensil retention plunger 400 may be in the form of a rectangular main body 402 having a lip 404 circumscribing a rearward side 412 of the main body. Main body 402 has a geometry generally defined by a top side 406, an opposite bottom side 408, a forward side 410, an opposite rearward side 412, a left side 414 and an opposite right side 416. Lip 404 circumscribing rearward side 412 is further defined by a perimeter edge 404a and a shoulder 404b defined between lip 404 and main body 402.

Top side 406 may have an upper stop limit projection 406a proximate forward side 410, and bottom side 406 may have a lower stop limit projection 408a proximate forward side 410. For example, upper and lower stop limit projections, 406a and 408a, respectively, may function to prevent marking utensil retention plunger 400 from being completely withdrawn from plunger-receiving cavity 320 of housing portion 304, by engaging interior surface 312b of rear side 312 of slide body 302, particularly in a fully assembled state where compression spring 52 (See FIG. 41) acts to bias the marking utensil retention plunger in a rearward direction (i.e., away from plunger receiving cavity 320.

A longitudinal opening 418 may be provided extending completely through main body 402 of marking utensil plunger 400 from top side 406 to bottom side 408. Longitudinal opening 418 has a generally rectangular shape at least partially defined by a forward interior side 418a, and opposing rearward interior side 418b, a right interior side 418c and an opposing left interior side 418d. A rear longitudinally-extending channel 418e may be provided in rearward interior side 418b of longitudinal opening 418. An opposing front longitudinally-extending channel 418f may be provided in forward interior side 418a of longitudinal opening 418.

Figure 42:
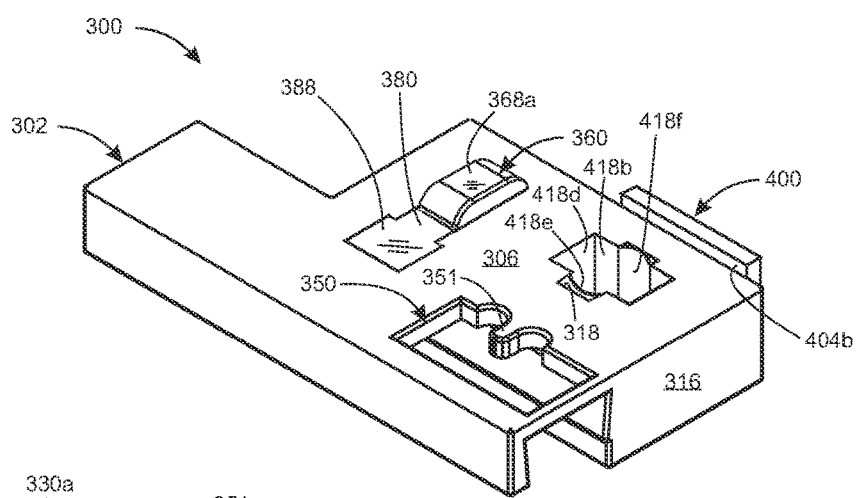
FIG. 42 is front-top-right isometric view of the slide assembly 300 of FIG. 41, shown in a fully-assembled state.
Figure 43:
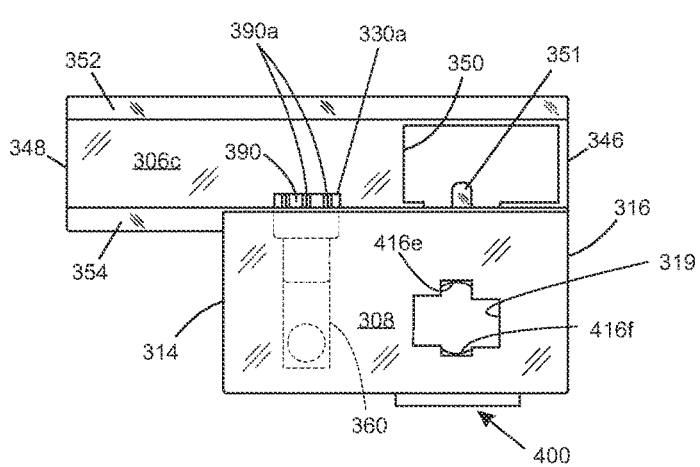
FIG. 43 is a bottom plan view of the fully-assembled slide assembly 300 of FIG. 42.

Referring now primarily to FIGS. 41-43, assembly of the slide assembly 300 will now be described in greater detail. Marking utensil retention plunger 400 is assembled into plunger-receiving cavity 320 via opening 312a in rear side 312 of housing portion 304 of slide body 302 (as indicated by directional arrow C), with compression spring 52 interposed between forward side 410 of main body 402 of marking utensil retention plunger 400 and a forward interior wall (not shown), opposite opening 312a, of the plunger-receiving cavity. Compression spring 52 biases marking utensil retention plunger 400 in a rearward direction (i.e., opposite the direction indicated by directional arrow C). Contact between upper stop limit projection 406a on top side 406 of main body 402 and lower stop limit projection 408a on bottom side 408 of the main body, and interior surface 312b of rear side 312 of housing portion 304 prevent marking utensil retention plunger 400 from being inadvertently dislodged from plunger-receiving cavity 320.

In order to secure a marking utensil to the slide assembly 300, marking utensil retention plunger 400 may be translated in a forward direction (i.e., by applying a force against rear side 412) until longitudinal opening 418 of marking utensil retention plunger 400 and upper opening 318 of slide body 302 are vertically aligned with one another, thereby compressing compression spring 52, and a marking utensil (not shown) subsequently inserted through the aligned openings in a vertical orientation with a marking end of the marking utensil directed downwardly to contact an upper surface of a flooring plank. Subsequently, upon releasing the manual force against rear side 412 the marking utensil becomes compressed between forward longitudinally extending channel 418e and upper opening 318 through top side area 306a of housing portion 304 of slide body 302.

In order to assemble slide lock member 360 into slide lock receiving cavity 322 of slide body 302, the slide lock member may be inserted into the slide lock receiving cavity (as indicated by directional arrow B) until lateral opening 384 extending through intermediate portion 364 is aligned with first pin-supporting aperture 317 and second pin-supporting aperture 326a, and then rigid pin 50 inserted through the aligned lateral opening 384 and pin-supporting apertures 317, 326a. With the slide lock member 360 assembled into slide lock receiving cavity 322, resilient biasing member 378 seats in circular depression 329a in the bottom side wall 329 of rearward portion 322a of slide lock receiving cavity 322. In this unbiased state (i.e., without any user force applied to the slide lock member 360), the resilient biasing member 378 forcibly rotates the slide lock member about rigid pin 50, such that rearward portion 362 is urged upward and forward portion 366 is urged downward. In this unbiased state, locking projections 390a on the bottom side 390 of forward portion 366 of slide lock member 360 extend downwardly through slot 330a in bottom side wall 330 of forward portion 322b of slide lock receiving cavity 322. A user can subsequently apply a downward pressure against top side 368 of rearward portion 362 to cause an opposite rotation of slide lock member 360 about rigid pin 50. In this biased state, locking projections 390a on the bottom side 390 of forward portion 366 of slide lock member 360 are retracted upwardly through slot 330a in bottom side wall 330 of forward portion 322b of slide lock receiving cavity 322.

Referring primarily now to FIGS. 44-48, the slide assembly 300 is shown assembled to linear slide rail feature 206 of tapping block body 202. In this assembled state, interior surface 342a of forward lateral side 342 of slide rail engagement portion 340 frictionally engages inwardly tapered front side 206c of linear slide rail feature 206, interior surface 344a of rearward lateral side 344 of slide rail engagement portion 340 frictionally engages inwardly tapered front side 206b of linear slide rail feature 206, and bottom surface 306c of top side area 306b of slide rail engagement portion 340 frictionally engages top side 206a of linear slide rail feature 206 of tapping block body 202. Furthermore, shoulder 311 (i.e., adjoining exterior surface 310a of front side 310 of housing portion 304 and interior surface 344a of rear lateral side 344 of slide rail engagement portion 340 of slide body 302) is supported upon corresponding shoulder 211 (i.e., adjoining rearward end 210 of base portion 204 to inwardly tapered rear end 206b of linear slide rail feature 206 of tapping block body 202). Significantly, in this assembled condition, when a marking utensil is coupled to slide assembly 300 it is aligned with visual measurement indicator projection 351 of measurement viewing opening 350.

Furthermore, with slide lock member 360 in an unbiased state (i.e., no downward force applied to the top side 368 of rearward portion 362 of the slide lock member), the locking projections 390a on the bottom side 390 of forward portion 366 of slide lock member 360 frictionally engage corresponding recessed measurement hash marks 207 in top side 206a of linear slide rail feature 206 to thereby prevent lateral translation of slide assembly 300 along the linear slide rail feature. In order to reposition the slide assembly 300, a user can simply apply a downward force to top side 368 of rearward portion 362 of slide lock member 360—thereby disengaging the locking projections 390a from the recessed measurement has marks 207—and selectively translate the slide assembly to a desired measurement position along linear slide rail portion 206.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is not intended that the invention be limited to the particular embodiments disclosed as the best mode contemplated for carrying out this invention, but that the invention will include all the embodiments falling within the scope of the appended claims.

What is claimed is:

1. A multi-functional flooring installation tapping block assembly, comprising:
  (a) a laterally-extending solid monolithic tapping block body having a geometry defined by:
    a solid, rectangular base portion having a top side, an opposite bottom side, a rear end, an opposite front end, a left/distal end and an opposite right/proximal end, wherein both the top and bottom sides of the solid, rectangular base portion are planar and parallel to each other;
    a raised linear feature extending upwardly from the top side of the base portion adjacent to the rear end thereof, the raised linear feature extending from the left/distal end to the right/proximal end of the tapping block body, the raised linear feature having a top side adjoined to the top side of the base portion via a vertical shoulder, the top side of the raised linear feature having length measurement markings disposed therealong;
    the front end of the base portion having a longitudinally oriented floor plank receiving slot therein proximate to the left/distal end of the base portion, the floor plank receiving slot defining a pair of spaced-apart proximal and distal prongs on laterally opposite sides thereof, the proximal prong having a lateral threaded opening extending completely therethrough; and
  (b) a threaded fastener sized and configured for threading engagement with the lateral threaded opening extending through the proximal prong,
  wherein, during use of the tapping block assembly to remove an excess portion of a flooring plank, the excess portion of the flooring plank may be partially inserted into the flooring plank receiving slot in the base portion of the tapping block body, and subsequently clamped between an interior surface of the flooring plank receiving slot and a distal end of the threaded fastener, to thereby enable the excess portion of the flooring plank to be detached by rotating the tapping block body along a plane perpendicular to a score line in an upper surface of the flooring plank.

2. The multi-functional flooring installation tapping block assembly recited in claim 1, wherein the distal prong has a lateral opening extending completely therethrough and aligned along a common central axis with the lateral opening through the proximal prong.

3. The multi-functional flooring installation tapping block assembly recited in claim 1, wherein the base portion of the tapping block body has a lateral recess defined along the front end thereof and extending from the proximal prong partway to the right/proximal end of the tapping block body.

4. The multi-functional flooring installation tapping block assembly recited in claim 3, wherein a distal portion of the lateral recess defines a mechanical fastener clearance, and a proximal portion of the lateral recess defines a hand grip.

5. A multi-functional flooring installation tapping block assembly, comprising:
  (a) a laterally-extending solid monolithic tapping block body having a geometry defined by:
    a solid, rectangular base portion having a top side, an opposite bottom side, a rearward end, an opposite forward end, a left/distal end and an opposite right/proximal end, wherein both the top and bottom sides of the solid, rectangular base portion are planar and parallel to each other;
    a raised linear slide rail feature protruding upwardly from the top side of the base portion adjacent to the rearward end thereof, the raised linear slide rail feature extending from the left/distal end to the right/proximal end of the tapping block body, the raised linear slide rail feature having a top side, an inwardly tapered rear side, and an opposite inwardly tapered front side, the top side of the raised linear slide rail feature having recessed measurement hash marks therein;
    a laterally extending shoulder adjoining the rearward end of the base portion of the tapping block body and the inwardly tapered rear side of the raised linear slide rail feature;
    the front end of the base portion having a longitudinally oriented floor plank receiving slot therein proximate to the left/distal end of the base portion, the floor plank receiving slot defining a pair of spaced-apart proximal and distal prongs on laterally opposite sides thereof, the proximal prong having a lateral threaded opening extending completely therethrough; and (b) a threaded fastener sized and configured for threading engagement with the lateral threaded opening extending through the proximal prong, wherein, during use of the tapping block assembly to remove an excess portion of a flooring plank, the excess portion of the flooring plank may be partially inserted into the flooring plank receiving slot in the base portion of the tapping block body, and subsequently clamped between an interior surface of the flooring plank receiving slot and a distal end of the threaded fastener, to thereby enable the excess portion of the flooring plank to be detached by rotating the tapping block body in a rotational direction perpendicular to a score line in an upper surface of the flooring plank.

6. The multi-functional flooring installation tapping block assembly recited in claim 5, wherein the distal prong has a lateral opening extending completely therethrough and aligned along a common central axis with the lateral opening through the proximal prong.

7. The multi-functional flooring installation tapping block assembly recited in claim 5, wherein the base portion of the tapping block body has a lateral recess defined along the front end thereof and extending from the proximal prong partway to the right/proximal end of the tapping block body.

8. The multi-functional flooring installation tapping block assembly recited in claim 7, wherein a distal portion of the lateral recess defines a mechanical fastener clearance, and a proximal portion of the lateral recess defines a hand grip.

9. The multi-functional flooring installation tapping block assembly recited in claim 5, wherein the right/proximal end of the tapping block body extends downwardly for a distance beyond the bottom side of tapping block body to define a lip at the right/proximal end of the tapping block body.

10. The multi-functional flooring installation tapping block assembly recited in claim 9, wherein the lip at the right/proximal end of the tapping block body is linear and has a uniform thickness.

11. The multi-functional flooring installation tapping block assembly recited in claim 10, wherein the lip functions as a wall spacer and has a thickness within a range of 0.1875 inches to 0.25 inches.

12. The multi-functional flooring installation tapping block assembly recited in claim 5, further comprising a slide assembly slidably mounted upon the raised linear slide rail feature of the tapping block body.

13. The multi-functional flooring installation tapping block assembly recited in claim 12, wherein the slide assembly is constructed to selectively carry a marking utensil for enabling use of the tapping block assembly to impart a linear marking line upon an upper surface of the flooring plank.

14. The multi-functional flooring installation tapping block assembly recited in claim 13, wherein the slide assembly further comprises:
a monolithic slide body;
a slide lock member assembled to the monolithic slide body, wherein manual manipulation of the slide lock member enables the monolithic slide body to be selectively translated along a length of the raised linear slide rail feature of the tapping block body and subsequently fixed at a desired position therealong; and
a marking utensil retention plunger assembled to the monolithic slide body.

15. The multi-functional flooring installation tapping block assembly recited in claim 14, wherein:
the monolithic slide body further comprises a housing portion and a slide rail engagement portion; and
the marking utensil retention plunger selectively secures a marking utensil to the housing portion of the slide body such that the marking utensil extends vertically through aligned upper and lower openings in respective top and bottom sides of the housing portion, and through a longitudinal central opening of a main body of the marking utensil retention plunger, with a marking end of the marking utensil projecting downwardly a distance below the bottom side of housing portion of slide body.

16. The multi-functional flooring installation tapping block assembly recited in claim 15, wherein the monolithic slide body further comprises:
a slide lock member receiving cavity defined in the top side of the monolithic slide body in which the slide lock member is assembled to the monolithic slide body; and
a marking utensil retention plunger receiving cavity defined within the housing portion of the slide body, the main body of the marking tool retention plunger received within the marking tool retention plunger receiving cavity via an opening defined in a rear side of the housing portion of the monolithic slide body.

17. The multi-functional flooring installation tapping block assembly recited in claim 16, wherein the top side of the monolithic slide body has a measurement viewing window defined through a top side area of the slide rail engagement portion of the monolithic slide body, the measurement viewing window defining a visual measurement indicator projection for selectively locating a position of the tapping block assembly along the raised linear slide rail feature of the tapping block body.

18. The multi-functional flooring installation tapping block assembly recited in claim 17, wherein the slide lock member is secured within the slide lock receiving cavity of the slide body by a rigid pin extending through a lateral opening in an intermediate portion of the slide lock member, wherein opposite ends of the rigid pin are secured to opposing left and right side walls of a rearward portion of the slide lock receiving cavity to thereby enable rotation of the slide lock member about a central axis of the rigid pin.

19. The multi-functional flooring installation tapping block assembly recited in claim 18, wherein the slide lock member further comprises:
at least one locking projection extending downwardly from a bottom side of a forward portion of the slide lock member; and
a resilient biasing member depending downwardly from a bottom side of a rearward portion of the slide lock member,
wherein in an unbiased state the resilient biasing member urges the at least one locking projection downwardly against the top side of the raised linear slide rail feature such the at least one locking projection frictionally engages at least one of the recessed measurement hash marks in the top side of the raised linear slide rail feature to thereby prevent linear translation of the slide assembly along the raised linear slide rail feature, and
wherein upon exerting a downward force upon a top side of a rearward portion of the slide lock member the resilient biasing member compresses to thereby rotate the at least one locking projection away from the front side of the raised linear slide rail feature such that the at least one locking projection frictionally disengages from the at least one recessed measurement hash mark in the top side of the linear slide rail feature to thereby enable linear translation of the slide assembly along the raised linear slide rail feature.

* * * * *